United States Patent Office 3,755,518
Patented Aug. 28, 1973

3,755,518
PRODUCTION OF FLEXIBLE AND RESILIENT
FOAMED PLASTICS
Fritz Stastny, Ludwigshafen, Rudolf Gaeth, Limburgerhof, and Heinz-Hermann Koerner, Ludwigshafen, Germany, assignors to Badische Anilin- & Soda-Fabrik Aktiengesellschaft, Ludwigshafen (Rhine), Germany
No Drawing. Filed May 28, 1970, Ser. No. 41,531
Claims priority, application Germany, May 31, 1969,
P 19 27 844.5
Int. Cl. B29d 27/04; B29h 3/02; B32b 25/02
U.S. Cl. 264—46
5 Claims

ABSTRACT OF THE DISCLOSURE

Production of flexible and resilient foamed plastics by foaming a vulcanizable latex, mixing the foamed product with expanded particles of an olefin polymer, filling the mixture into a mold, heating the mixture therein to a temperature of from 70° to 150° C., removing the flexible and resilient foam therefrom and drying said foam. The flexible and resilient foamed plastics are used as upholstery padding, for thermal insulation and as shock-absorbing materials.

---

The invention relates to a process for the production of combined foamed plastics from vulcanizable latices and expanded olefin polymer particles.

Vulcanizable natural or synthetic latices in the form of aqueous dispersions (rubber content about 60%) are widely used as raw materials for the production of flexible and resilient foamed plastics. By introducing air into batches having a specific composition, an increase in volume of the batch of about four to fourteen times is obtained and it can then be processed into a predominantly open-cell flexible foam by vulcanization at elevated temperature and by extraction of water. The density of these foamed plastics is from 80 to 120 kg./m.³ for industrial use. At a lower density the foam exhibits only slight resistance to compression. The foamed plastics are widely used as padding material provided their excessive softness does not militate against industrial use.

It is known that the cost of latex as compared with the finished latex foam is relatively high. Attempts have therefore been made to prepare cheaper foamed plastics by incorporating certain additives in the foamed latex which do not substantially alter the character of the latex foam.

It is an object of the invention to provide flexible and resilient foams which have a lower density, a not much lower compression set and higher resistance to compression than prior art latex foams, and a process for their production.

The object of the invention is achieved with foamed plastics materials comprising 0.1 to 2.0 parts by weight of expanded olefin polymer particles having a diameter of 3 to 15 mm. and a bulk density of 5 to 50 g./l. and 1 part by weight of foamed latex, the olefin polymer particles being uniformy distributed throughout the foamed latex.

The foamed plastics material is obtained by foaming the vulcanizable latex to four to fifteen times the volume of the aqueous dispersion, mixing the foamed latex with the expanded olefin polymer particles, 0.5 to 10 parts by weight of foamed latex, with reference to the solid substance in the latex, being used per part by weight of expanded olefin polymer particles, heating the mixture to 70° to 150° C. in a mold, removing the combined foamed plastics molding from the mold and drying it by a conventional method to remove water.

The term "latices" includes all aqueous dispersions of natural and synthetic rubber which can be foamed and vulcanized. Synthetic latices suitable for the process according to this invention may be prepared by emulsion or suspension polymerization or by dispersing polymers in water with the addition of emulsifiers. The aqueous dispersions generally contain 30 to 70% by weight of the disperse phase. In the case of synthetic latices the disperse phase consists of a copolymer based on butadiene and styrene, butadiene and an acrylate, butadiene and acrylonitrile, butadiene and vinylpyridine, chlorobutadiene and styrene, chlorobutadiene and acrylonitrile, isoprene and styrene, isoprene and isobutylene or on synthetic polyisoprene or polybutadiene. Copolymers of butadiene and styrene are particularly suitable for the process according to this invention.

Suitable copolymers as a rule contain from 50 to 95% by weight, preferably from 70 to 80% by weight, of the butadiene or isoprene component.

For the production of the foamed latex, the aqueous dispersion must contain conventional auxiliaries, for example antioxidants, foam stabilizers, vulcanization accelerators and colloidal sulfur. These mixtures are foamed to four to fifteen times their original volume by stirring in air and have added to them activated zinc oxide and a gelling agent for example, sodium silicofluoride or potassium silicofluoride. Foaming and vulcanization of the latices are carried out by conventional methods, cf. for example H. J. Stern, "Rubber, Natural and Synthetic," MacLaren and Sons Ltd., London, 1967.

The foamed latex which has not yet been vulcanized is mixed at room temperature with expanded particles of olefin polymer. Olefin polymers for the purposes of the present invention are those whose X-ray crystallinity at 25° C. is more than 25%. Homopolymers of ethylene, propylene and butylene, copolymers of these monomers and copolymers of ethylene with other ethylenically unsaturated monomers which contain at least 50% by weight of ethylene, propylene or butylene units are suitable for the process. It is preferable to use copolymers of ethylene with 5 to 30% by weight of esters of acrylic or methacrylic acid with alcohols having one to eight carbon atoms or vinyl carboxylic esters of carboxylic acids having two to six carbon atoms. Among the comonomers, n-butyl acrylate, tertiary-butyl acrylate and vinyl acetate are of particular importance.

Expanded particles of olefin polymer having a diameter of from 1 to 30, preferably from 3 to 15 mm. are used for the process according to the invention. By expanded particles we mean particles in which the cell membranes consist of olefin polymer. It is preferred to use for the process particles having a preponderant proportion of closed cells. The expanded particles are obtained by conventional industrial methods, for example by mixing the olefin polymer with an expanding agent in an extruder and extruding the mixture through a die, the extrudate containing expanding agent being comminuted immediately after it has left the die. It is also possible however to use particles which have been obtained by heating mixtures of olefin polymers and expanding agents which decompose to form gaseous products. The expanded particles as a rule do not contain any expanding agent, i.e., they are completely expanded. It is however also possible to use expanded particles which still contain residual expanding agent.

When a higher thermal stability is desired, it is advantageous to use expanded particles of olefin polymers, particularly of ethylene homopolymers and ethylene copolymers, which contain crosslinked fractions (gel content) for example of 10 to 85% by weight, preferably of 30 to 70% by weight. The gel content is defined as the proportion by weight of the polymer which is insoluble in solvents at temperatures above the crystallite melting point. In the case of olefin polymers the gel content may be determined for example by heating the particles in toluene at a temperature of 100° C. for twenty-four hours and filtering off and drying the insoluble fractions.

The expanded particles containing crosslinked fractions may be obtained by various methods. Among these, a method has proved to be particularly suitable in which the expanded closed-cell particles are treated with high-energy radiation, for example X-rays or electron beams may be allowed to act on the particles. In one method for the production of the particles which is particularly suitable, the particulate expanded olefin polymer is treated with electron beams, the dosage being from about 10 to 60 mrad. The production of these particles is described for example in French patent specification No. 1,523,988.

It is however, also possible to use expanded particles which have been crosslinked by means of peroxides. These particles are obtained by conventional methods, for example by foaming a mixture of an olefin polymer, expanding agent and peroxides as crosslinking agent and then comminuting the foamed plastics material. Comminution products of olefin polymer moldings which have been obtained by expansion by means of azodicarbonamide with an addition of dicumyl peroxide are for example suitable.

The bulk density of the expanded particles is from 5 to 50, preferably from 10 to 30 g./l. For the production of foams having a higher density, expanded particles may be used whose bulk density is up to 200 g./l.

The particles of the expanded olefin polymers may contain, in addition to the polymers, other components such as flame retardants, dyes, fillers, lubricants or other polymers, for example polyisobutylene.

The proportion of expanded particles in relation to the foamed latex may be varied within wide limits in the production of mixtures of foamed latex and expanded olefin polymer particles. It is also possible to vary the degree of expansion of the latices, for example from four to fifteen times the volume of the dispersion. Generally from 0.1 to 1.5, preferably from 0.3 to 0.6, liters of foamed latex (which has been foamed to the extent of from four to fifteen, preferably from seven and a half to ten, times the volume of the dispersion) is used per liter of expanded olefin particles having a bulk density of from 5 to 50 g./l. The weight ratio of the two components in the mixture should be adjusted according to the composition of the vulcanizable batch so that for each part by weight of expanded olefin polymer particles there is used from 0.5 to 10, preferably from 2 to 4, parts by weight of a foamed latex mixture, with reference to the solids in the latex.

The mixtures of expanded olefin polymer particles and foamed latex may also be colored. It is also possible to add additives commonly used in latex technology to the said mixtures.

The mixture of foamed latex and expanded olefin polymer particles which still contains water and has not been vulcanized is then poured into metal molds, advantageously preheated to 30° to 40° C., in order to vulcanize the rubber component. The molds are then kept for thirty minutes to two hours at 70° C. to 150° C., preferably from 85° to 100° C., depending on the extent to which the molds have been filled.

The type of heating depends on the thermal stability of the olefin polymer. The molds may be heated for example by means of hot air, steam, infrared radiation or in a heatable press.

After vulcanization, the combined foamed plastics material is taken out of the mold and kept for one to seventy-two hours (depending on its thickness) at from 50° to 100° C., preferably at from 70° to 80° C. The combined foams may be washed with water after vulcanization; they are dried by methods conventionally used in latex technology (cf. H. J. Stern, "Rubber, Natural and Synthetic," Maclaren & Sons Limited, London, 1967, chapter 10). Excess water may be removed particularly advantageously by centrifuging (hydroextraction).

In a preferred embodiment of the process according to the invention, the homogeneous mixture of foamed latex and expanded olefin polymer particles is compressed, prior to vulcanization, in the mold by 5 to 20%, preferably 10 to 15%, of its original filled height for example by means of fine-meshed wire netting. Compression of the mixtures prior to vulcanization may generally be carried out in molds which are not gastight when closed. If compression is carried too far, there is a risk that foamed latex may be forced to the surface.

The degree of compression of the mixture of foamed latex and expanded olefin polymer particles is dependent on the diameter of the expanded olefin polymer particles and on the amount of foamed latex used. During compression of the mixture, the expanded olefin polymer particles are brought closer together with slight deformation so that any cavities existing in the mixture between the olefin polymer particles are practically completely filled out. For example if expanded olefin polymer particles having a diameter of 10 mm. are used and the amount of foamed latex per liter of expanded particles is 20 g. with reference to the solids in the dispersion, the mixture is advantageously compressed by 15% of its original bulk height in the mold and the rubber component in the mixture is then vulcanized. A foam is obtained which has practically no cavities.

The advantage of this special embodiment of the process according to this invention lies in the fact that less latex is required for the production of the combined foams. Moreover, the foamed plastics obtained have improved mechanical properties, for example greater compression resistance and higher energy absorption. Moreover, their water vapor permeability is lower than that of comparable foamed plastics in the production of which the mixture of expanded olefin polymer particles and foamed latex has not been compressed. Very homogeneous foamed plastics in which the expanded olefin polymer particles are uniformly distributed are obtained by the process according to this invention. The expanded particles are held together by an elastic skeleton of foamed vulcanized latex. The proportion of open cells in the combined foam may be decreased to less than 50% (foamed latex has practically 100% of open cells). It is known that foamed plastics prepared from pure vulcanizable latex shrink by about 5% in volume when dried. In contrast to this, shrinkage is insignificant in the case of foams prepared by the process according to this invention which have been vulcanized with compression.

The strength of the new foamed plastics is, surprisingly, so great that they may be used advantageously for many industrial applications. These foamed plastics have other advantages over foamed plastics based on pure latex. In particular it is possible to prepare foams having an average density of 40 to 80 kg./m.³. As already stated above, foams prepared from pure foamed latex which are suitable for industrial applications have a much higher density. In spite of the lower density of the foams prepared by the process according to the invention, the following properties (important for industrial applications) are more favorable than in the case of pure latex foamed materials having the same density. The foamed plastics of the invention have a compression resistance which is up to about five times higher, better shock-absorbing properties and, when the mixture of foamed latex and olefin polymer particles is compressed to a higher degree, a lower water vapor permeability and consequently a higher water vapor diffusion resistance factor, and a higher hardness value upon compression according to German standard specification No. 53,576. By reason of their lower density, they also exhibit lower thermal conductivity. Since the foamed plastics of the invention have a high proportion by volume of closed-cell expanded olefin polymer particles, they are also permanently buoyant. Surprisingly, the shock elasticity of combined foams of foamed vulcanized latex and expanded olefin polymer particles is practically the same as that of pure latex foams having the same density when tested according German standard specification No. 53,512, as is also the compression set at 20° and 40° C. according to German standard specification No. 7,790, which as a rule is less than 5%.

This is true particularly of foams which have been prepared with expanded particles of fairly soft olefin copolymers. Foamed plastics having expanded particles of homopolymers generally yield somewhat more rigid products which are however flexible and exhibit good resilience.

Foams prepared according to the invention may be used advantageously for many applications because their properties are in many respects superior to those of pure latex foamed products. The new foamed plastics may for example be used for the same purposes as pure latex foams or soft elastic foams, for example as padding, seals, packaging material, shock-absorbing material, mattresses, for applications in the furniture and building industries as insulating material in the refrigeration industry, and as floating intermediate flooring and carpet underlays and the like. The foams may be cut with band saws into practically any thickness so that they can be adapted to the purpose for which they are to be used.

The following examples illustrate the invention. The parts and percentages given in the examples are by weight.

EXAMPLE 1

A latex foam is first prepared by mixing the following components containing water with each other; 167 parts of natural latex containing 67 parts of water; 7 parts of 10% ammonium oleate, 5 parts of 70% sulfur paste, 4 parts of 50% di-β-naphthyl-p-phenylenediamine, 3.3 parts of a 10% aqueous solution of the sodium salt of a condensation product of β-naphthalenesulfonic acid and formaldehyde, 2.3 parts of 25% zinc diethyl dithiocarbamate and 2.3 parts of 25% zinc-N-pentamethylene dithiocarbamate. This mixture is foamed to 7.5 times its original volume in beating equipment, mixed with 4 parts of 40% zinc oxide paste containing water and then has added to it 4 parts of a 25% aqueous ammonium nitrate solution. 400 parts of latex foam is then mixed with 200 parts of expanded particles of polyethylene in mixing equipment running at a low speed. The completely expanded polyethylene particles are prepared by mixing polyethylene which softens at from 105° to 110° C. with isobutane in an extruder while heating under pressure. The hot mixture is extruded through a die and comminuted. After having been comminuted, the particles expand. The expanded polyethylene particles have a diameter of 12 mm. and a bulk density of 12.5 g./l. The mixture of foamed latex and expanded particles of polyethylene are introduced into an aluminium mold. The filling height is 5 cm. To vulcanize the rubber component in the mixture, the mixture in the mold is stored for ninety minutes at 100° C. in a heating cabinet. The foam removed from the mold is dried for ten hours at 70° C. in a through-circulation hot-air dryer. The foam has a density of 46 g./l. and a resilience of 54% according to German standard specification No. 53,521. The foamed plastics material is suitable as upholstery padding and insulating material of all types.

Particles of expanded olefin polymers having a diameter of 9 mm. are prepared from the polymers specified in Table 1. These olefin polymer particles and the foamed latex are then processed into expanded plastics materials in the manner described above.

In Table 1:

Softening = the softening range of the polymer in ° C.;
MI = melt index
BD = bulk density of the foamed particles in g./l.;
FP = parts by weight of foamed particles; and
FL = parts by weight of foamed latex.

TABLE 1

| Expanded particles of— | Softening | MI | BD | FP | FL |
|---|---|---|---|---|---|
| Polypropylene | 150-160 | (¹) | 22 | 1 | 0.5 |
| Polybutene | 125-130 | 1.5 | 18 | 1 | 1 |
| Copolymer of 80% of ethylene and 20% of propylene | 150-170 | 2.5 | 15 | 1 | 3 |
| Polyethylene | 105-110 | 0.9 | 12 | 1 | 2.9 |
| Do | 105-110 | 0.9 | 12 | 1 | 5 |
| Do | 105-110 | 0.9 | 12 | 1 | 4.2 |
| Do | 105-110 | 0.9 | 12 | 1 | 5 |

¹ Intrinsic viscosity 3.

Foams are obtained which can be used for example as damping pads for placing under equipment subject to vibration.

EXAMPLE 2

The water-containing components specified in Table 2 under (a) to (g) are mixed according to Example 1 and foamed to ten times the volume of the mixture in beating equipment. The substances under (h) and (i) are added to the foamed latex.

TABLE 2

| | Parts | Parts of dry substance |
|---|---|---|
| (a) 70% aqueous dispersion of a copolymer of 75% of butadiene and 25% of styrene | 143 | 100 |
| (b) 33% potassium ricinoleate | 1.5 | 0.5 |
| (c) 70% sulfur paste | 2.9 | 2.0 |
| (d) 25% zinc-N-pentamethylenedithiocarbamate | 4 | 1 |
| (e) 25% zinc diethyldithiocarbamate | 4 | 1 |
| (f) 50% di-β-naphthyl-p-phenylenediamine | 1 | 0.5 |
| (g) Condensation product of ammonia, ethyl chloride and formaldehyde 50% | 0.5 | 0.25 |
| (h) Zinc oxide paste 40% | 5 | 3 |
| (i) Sodium silicofluoride paste 25% | 4 | 1 |

78% of a copolymer of 77.2% of ethylene and 22.8% of tertiarybutyl acrylate, 19% of polyisobutylene having a molecular weight of 150,000 and 3% of talc are mixed with a low-boiling expanding agent, for example isopentane, in an extruder while heating at superatmospheric pressure. The hot mixture is extruded through a die and comminuted. The particles expand after comminution. The particles expand after comminution. The bulk density of the particles is 12 g./l. and the diameter of the particles is 14 mm. 900 parts of the foamed latex, which is still wet, is then mixed with 300 parts of expanded particles. A mixture is obtained which is still pourable. It is introduced into a metal mold measuring 50 x 50 x 10 cm. which has been preheated to 40° C.

The filled mold is placed inside a second metal mold whose internal dimensions (length, width and height) are 5 mm. greater than the external dimensions of the first mold and whose bottom and side walls are heated to 85° C., and kept therein for forty-five minutes. The foam is then removed from the mold, washed with water, centrifuged and dried for three hours at 65° C. A foamed plastics material is obtained having a density of 61.8 g./l. which may be used in many ways as shock-absorbing material, for example for packing domestic appliances.

Expanded particles of copolymers of 75% by weight of ethylene and 25% by weight of methyl methacrylate, of 90% by weight of ethylene and 10% by weight of ethyl acrylate or of 80% by weight of ethylene and 20% by weight of butyl acrylate may be used in the same way.

EXAMPLE 3

A latex foam which has been expanded to six times the volume of the dispersion is prepared by the method according to Example 1 from the components set out in Table 3.

Table 3 gives the components for the production of the latex foam. The individual components contain water as the second constituent.

TABLE 3

| | Parts | Parts of dry substance |
|---|---|---|
| (a) 50% dispersion of a copolymer of 80% of chlorobutadiene and 20% of acrylonitrile | 115 | 80 |
| (b) Natural latex 60% | 34 | 20 |
| (c) Ammonium oleate 10% | 5 | 0.5 |
| (d) Potassium ricinoleate soap 35% | 1.4 | 0.5 |
| (e) Sulfur paste 70% | 2.9 | 2.0 |
| (f) Di-β-naphthyl-p-phenylenediamine 50% | 0.5 | 0.25 |
| (g) Zinc-N-pentamethylene dithiocarbamate 25% | 4 | 1 |
| (h) Zinc diethyldithiocarbamate 25% | 4 | 1 |
| (i) Sodium salt of the condensation product of β-naphthalenesulfonic acid and formaldehyde 10% | 3 | 0.3 |
| (k) Condensation product of ammonia, ethyl chloride and formaldehyde 50% | 0.5 | 0.25 |
| (l) Zinc oxide paste 40% | 8.75 | 3.5 |
| (m) Sodium silicofluoride paste 25% | 6 | 1.5 |

Expanded particles are prepared from a copolymer which consists of 89% of ethylene and 11% of vinyl acetate, which softens at 92° to 94° C. and has a melt index of 3.5 by homogenizing the copolymer in an extruder by heating at superatmospheric pressure with a low-boiling mixture of paraffin hydrocarbons, extruding the hot mixture through a die and comminuting the product. The particles expand after comminution. The completely expanded particles have a diameter of 10 mm., a bulk density of 12 g./l. and are irradiated in an electron accelerator (dosage 30 mrad). The irradiated particles then have a gel fraction of 42%.

600 parts of the wet foamed latex is mixed with 200 parts of expanded particles of a copolymer of 89% of ethylene and 11% of vinyl acetate. The mixture of wet foamed latex and expanded olefin polymer particles is poured into an aluminum mold measuring 30 x 30 x 10 cm. and which has been heated to 30° C. The mixture fills the mold to a height of 10 cm. The mixture is compressed to a height of 9 cm. by pressing with fine-meshed wire netting and kept in this condition in hot air at 85° C. for ninety minutes. After removal from the mold, the foam product obtained is washed, centrifuged and then kept for five hours at a temperature of 70° C. The volume of the molding is practically unchanged by drying. A flexible and very resilient foam is obtained having a density of 75.3 g./l. which may be advantageously used particularly as padding in motor vehicles, sound-deadening boards and insulating material for buildings. Such foams may also be used as buoyancy inserts in life-saving equipment of various types.

Crosslinked expanded particles of olefin polymers are prepared from the polymers specified in Table 4 by the method described in Example 3. Foams are obtained when, as described above, the olefin polymer particles are mixed with foamed latex and the rubber component is vulcanized. The foam products are particularly suitable as elastic and resilient interlayers.

In Table 4, the polymers are composed of:

(A) 83% by weight of ethylene and 17% by weight of tertiary-butyl acrylate;

(B) 80% by weight of ethylene and 20% by weight of vinyl acetate;
(C) 75% by weight of ethylene and 25% by weight of n-butyl acrylate; and
(D) ethylene.

TABLE 4

| | A | B | C | D |
|---|---|---|---|---|
| Bulk density of the expanded olefin polymer particles in g./l. | 16 | 35 | 21 | 14 |
| Radiation dosage in mrad | 60 | 50 | 15 | 10 |
| Gel content in percent | 84 | 68 | 39 | 31 |
| Parts by weight of foamed latex based on solid | 5.5 | 2 | 3.4 | 1 |
| Parts by weight of olefin polymer | 1 | 1 | 1 | 1 |
| Compression of the mixture in percent | 5 | 7.5 | 2.5 | 10 |

We claim:
1. A process for the production of flexible and resilient foamed plastics which comprises foaming a vulcanizable latex in the form of an aqueous dispersion of a material selected from the group consisting of natural rubber and synthetic rubber, said synthetic rubber having as its dispersed phase either a copolymer selected from the group consisting of butadiene and styrene, butadiene and an acrylate, butadiene and acrylonitrile, butadiene and vinyl-pyridine, chlorobutadiene and styrene, chlorobutadiene and acrylonitrile, isoprene and styrene, isoprene and isobutylene or polyisoprene or polybutadiene to 4 to 15 times the volume of the aqueous dispersion, mixing 0.5 to 10 parts by weight, with reference to the solids in the latex, of the foamed latex with 1 part by weight of expanded particles of an olefin polymer which has an X-ray crystallinity at 25° C. of more than 25% and is selected from the group consisting of homopolymers of ethylene, propylene, butylene, copolymers of these monomers with each other and copolymers of ethylene with esters of acrylic or methacrylic acid with alcohols having one to eight carbon atoms and vinyl carboxylic esters of carboxylic acids having two to six carbon atoms, which copolymers contain at least 50% by weight of ethylene units, placing the mixture in a mold, heating the mixture therein to a temperature of from 70 to 150° C., removing the flexible and resilient foam therefrom and drying said foam.

2. A process as claimed in claim 1 wherein the expanded polyolefin particles have a density of from 5 to 50 g./l. and a diameter of from 1 to 30 mm.

3. A process for the production of flexible and resilient foamed plastics which comprises foaming a vulcanizable latex in the form of an aqueous dispersion of a material selected from the group consisting of natural rubber and synthetic rubber, said synthetic rubber having as its dispersed phase either a copolymer selected from the group consisting of butadiene and styrene, butadiene and an acrylate, butadiene and acrylonitrile, butadiene and vinylpyridine, chlorobutadiene and styrene, chlorobutadiene and acrylonitrile, isoprene and styrene, isoprene and isobutylene or polyisoprene or polybutadiene to 4 to 15 times the volume of the aqueous dispersion, mixing 0.5 to 10 parts by weight, with reference to the solids in the latex, of the foamed latex with 1 part by weight of expanded particles of an olefin polymer which has an X-ray crystallinity at 25° C. of more than 25% and is selected from the group consisting of homopolymers of ethylene, propylene, butylene, copolymers of these monomers with each other and copolymers of ethylene with esters of acrylic or methacrylic acid with alcohols having one to eight carbon atoms and vinyl carboxylic esters of carboxylic acids having two to six carbon atoms, which copolymers contain at least 50% by weight of ethylene units, placing the mixture in a mold, compressing the mixture therein by 5 to 20% of the original filling height, heating the mixture in the compressed state to a temperature of from 70 to 150° C., removing the flexible and resilient foam from the mold and drying said foam.

4. A process as claimed in claim 1 wherein the expanded particles are selected from the group consisting of polyethylene, polypropylene, polybutylene, ethylene-tertiary-butyl acrylate copolymer, ethylene-vinyl acetate copolymer and ethylene-n-butyl acrylate copolymer.

5. A process as claimed in claim 1 wherein the expanded particles consist of ethylene polymers which have 10 to 85% by weight of crosslinked portions.

References Cited
UNITED STATES PATENTS

| | | | |
|---|---|---|---|
| 3,277,026 | 10/1966 | Newham et al. | 260—723 X |
| 3,503,840 | 3/1970 | Parrish | 264—46 UX |
| 3,551,274 | 12/1970 | Shannon | 264—46 X |
| 3,336,184 | 8/1967 | Stastny | 264—46 X |
| 3,608,031 | 9/1971 | Stastny | 264—51 X |
| 3,504,068 | 3/1970 | Zizlsparger | 264—53 X |
| 3,251,916 | 5/1966 | Newnham | 264—45 X |
| 2,827,666 | 3/1958 | Wagner | 264—45 X |
| 3,517,414 | 6/1970 | Carson | 264—321 X |
| 3,193,598 | 7/1965 | Schafer | 264—45 X |
| 2,806,509 | 9/1957 | Bozzacco | 264—45 X |

PHILIP E. ANDERSON, Primary Examiner

U.S. Cl. X.R.

161—159, 168; 260—2.5 B, 723; 264—50, 53, 119, 236, 321, DIG. 7, DIG. 16

UNITED STATES PATENT OFFICE
CERTIFICATE OF CORRECTION

Patent No. 3,755,518    Dated August 28, 1973

Inventor(s) Fritz Stastny et al

It is certified that error appears in the above-identified patent and that said Letters Patent are hereby corrected as shown below:

Column 6, "Table 1", table column "FL", third item, "3" should read -- 2 --.
fourth item, "2.9" should read -- 2.5 --.
fifth item, "5" should read -- 3 --.
sixth item, "4.2" should read -- 4.5 --.
seventh item, "5" should read -- 6 --.

Column 6, "Table 2", item "e", "diethyldithicoarbamate" should read -- diethyldithiocarbamate --.

Signed and sealed this 15th day of October 1974.

(SEAL)
Attest:

McCOY M. GIBSON JR.
Attesting Officer

C. MARSHALL DANN
Commissioner of Patents